(12) United States Patent
Tardivo

(10) Patent No.: US 8,496,413 B2
(45) Date of Patent: Jul. 30, 2013

(54) END MILL WITH DIFFERENT HELIX ANGLES

(75) Inventor: Maurizio Tardivo, Brentonico (IT)

(73) Assignee: Sandvik Intellectual Property AB, Sandviken (SE)

( * ) Notice: Subject to any disclaimer, the term of this patent is extended or adjusted under 35 U.S.C. 154(b) by 334 days.

(21) Appl. No.: 12/810,388

(22) PCT Filed: Mar. 30, 2009

(86) PCT No.: PCT/EP2009/053708
§ 371 (c)(1),
(2), (4) Date: Sep. 14, 2010

(87) PCT Pub. No.: WO2009/124851
PCT Pub. Date: Oct. 15, 2009

(65) Prior Publication Data
US 2011/0013998 A1    Jan. 20, 2011

(30) Foreign Application Priority Data

Apr. 10, 2008  (DE) .......................... 10 2008 018 399

(51) Int. Cl.
*B23C 5/10* (2006.01)
(52) U.S. Cl.
CPC ....................................... *B23C 5/10* (2013.01)
USPC .............................................. 407/53; 407/61
(58) Field of Classification Search
USPC ............................... 407/53, 54, 56, 58, 60, 61
IPC ................................................. B23C 5/10,5/02
See application file for complete search history.

(56) References Cited

U.S. PATENT DOCUMENTS

| | | | |
|---|---|---|---|
| 4,963,059 A | 10/1990 | Hiyama | |
| 5,221,163 A * | 6/1993 | Nishimura | 407/53 |
| 2005/0053438 A1 * | 3/2005 | Wetzl et al. | 408/225 |
| 2006/0188345 A1 * | 8/2006 | Greenwood et al. | 407/54 |
| 2008/0069650 A1 | 3/2008 | Maushart et al. | |

FOREIGN PATENT DOCUMENTS

| | | |
|---|---|---|
| DE | 3413290 | 10/1985 |
| DE | 37 06 282 | 9/1987 |
| DE | 297 15 192 | 12/1997 |
| DE | 10 2005 002 698 | 7/2006 |
| EP | 1 894 655 | 3/2008 |
| FR | 2875722 A1 * | 3/2006 |

OTHER PUBLICATIONS

Tool and Manufacturing Engineers Handbook, May 21, 1984, McGraw-Hill Book Co., Fourth Edition, Chapter 10, pp. 33-34.*
English machine translation of FR 2,875,722 A1.*
English translation of the international preliminary report on patentability issued in PCT/EP2009/053708, mailing date Dec. 2, 2010, 9 pages.
International Search Report dated Jul. 24, 2009.
German Search Report dated Oct. 22, 2008.

* cited by examiner

*Primary Examiner* — Daniel Howell
*Assistant Examiner* — Alan Snyder
(74) *Attorney, Agent, or Firm* — Morgan, Lewis & Bockius LLP

(57) ABSTRACT

End mill, primarily for coarse machining, has even number of main flutes spiraling around the periphery of the mill, the flutes having a relatively smaller and a relatively larger helix angle relative to the axis of the mill and wherein uneven-numbered main flutes are defined in that they include the smaller helix angle with the axis. Directly at the end face, distances between peripheral angles of successive main flutes in the direction of rotation are smaller between uneven-numbered main flutes and subsequent even-numbered main flutes than the distances between peripheral angles between even-numbered main flutes and subsequent uneven-numbered main flutes. The end mill is better able to prevent vibrations of the tool due to intermittent engagement with a work piece by having all distances between peripheral angles at the end face of the mill different from one another.

16 Claims, 5 Drawing Sheets

END MILL WITH DIFFERENT HELIX ANGLES

RELATED APPLICATION DATA

This application is a §371 National Stage Application of PCT International Application No. PCT/EP2009/053708 filed Mar. 30, 2009, and claims priority under 35 U.S.C. §119 and/or §365 to German Application No. 10 2008 0180399.7, filed Apr. 10, 2008.

The present invention relates to an end mill for rough machining of metallic work pieces, comprising an even number of main cutting edges helically extending along the circumference of the mill, said main cutting edges alternately forming a relatively smaller and a relatively larger helix angle with the axis of the mill, wherein odd-numbered cutting edges are defined as those forming the smaller helix angle with the axis, and wherein immediately at the frontal end of the mill the circumferential angular distances between the odd-numbered main cutting edges and the even-numbered main cutting edges following them in a rotational direction are smaller than the circumferential angular distances between the even-numbered main cutting edges and the odd-numbered main cutting edges following them in a rotational direction.

It should be noted that the definition of "even" and "odd" cutting edges is arbitrarily selected, which means that the terms "even-numbered" and "odd-numbered" might as well be exchanged throughout the present claims and description. As an alternative one as well define first and second groups of main cutting edges. Further, the cutting edges of an end mill extending helically around a peripheral surface of revolution are named the main cutting edges, while optional cutting edges at the front end and extending in a plane substantially perpendicular to the axis of the mill are named minor cutting edges.

A corresponding mill is known from document DE 37 06 282. This document describes an end mill with an even number of main cutting edges having the same circumferential distance from one another in at least one plane perpendicular to the axis of the mill.

The purpose of such a mill, on basis of the different circumferential distances between consecutive cutting edges on the one hand consists in preventing that the mill is caused to vibrate or possibly to resonate by the intermittent engagement with the work piece, and on the other hand, a corresponding mill should also be relatively easy to manufacture without too much ado. Finally, it is important that the load and thus the wear occurring during milling is distributed to all cutting edges as evenly as possible.

The aforementioned document DE 37 06 282 in particular deals with a configuration of the mill permitting an easier manufacture as has previously been known from the state of the art.

However, document DE 37 06 282 thereby accepts that in at least one plane the circumferential angular distances of all four cutting edges are identical, wherein there has to be considered that owing to the, all in all, relatively slight differences between the different helix angles also areas adjoining the corresponding axial plane still largely fulfil the condition that there the cutting edges have substantially identical distances in a circumferential direction. This area becomes the larger, the lesser the different helix angles of the main cutting edges differ. Further, two equal pairs of angular distances between the main cutting edges occur at the front end of this prior art mill This may lead to vibrations of the mills may not being prevented to a degree as it is inherently intended by the different cutting edge distances.

It is thus the object of the present invention to produce an end mill with the above-cited features which is able to prevent vibrations of the tool resulting from the intermittent engagement with a workpiece even better.

For such an end mill this object is achieved in that all circumferential angular distances at the frontal end of the mill differ from one another.

By avoiding that respective pairs of circumferential angular distances at the frontal end of the mill are identical, and in consideration of the further condition that the main cutting edges alternately form a relatively smaller and a relatively larger helix angle with the axis of the mill, the situation can be prevented that in any plane perpendicular to the axis of the mill in an arbitrary axial position all circumferential angular distances between the adjoining main cutting edges are identical. This further reduces the risk of possible vibrations.

Thus, an embodiment of the invention is particularly preferred in which the circumferential angular distances at the frontal end of the mill and the different helix angles are selected such that along the further axial course of the main cutting edges from the frontal end towards the mounting end the circumferential angular distances take at least two different values everywhere (i.e. in any axial position). Moreover, a configuration of the invention is preferred in which the circumferential angular distances at the frontal end of the mill and the different helix angles are selected such that only in a total of three different axial positions at least two circumferential angular distances are identical and that in all other axial positions all circumferential angular distances differ from one another. In this way already the areas in which only two of the circumferential angular distances are identical are reduced to a minimum. In this position, which preferably approximately corresponds to an axial central position between the frontal end and the rear end of the main cutting edges, two circumferential angular distances could have a first value which is identical among them, and two further circumferential angular distances could have a second value which is different from said first value but still identical among them.

Thus, despite the fact that in this single axial position a first pair of circumferential angular distances and a second pair of circumferential angular distances are each displaying the same value, these values differ between said two pairs. In this way even in this axial region where the number of different circumferential angular distances is at a minimum and possibly is only two, the occurrence of resonant conditions is still substantially prevented.

This also renders corresponding mills not only suitable for roughing but even suitable for finishing or smoothing, wherein with smoothing due to the smaller chip thicknesses the forces acting on the main cutting edges are smaller anyway.

In the positions where a respective pair of circumferential angular distances is identical, a configuration of the invention is preferred in which these identical circumferential angular distances are respective adjoining circumferential angular distances.

Furthermore, a configuration of the invention is preferred in which the helix angle of the odd-numbered main cutting edges is in the range between 35° and 39° and especially about 37° and the helix angle of the even-numbered main cutting edges is in the range between 38° and 42° and especially about 40°. The difference between the helix angles should preferably be in the order of 3° and can range between e.g. 1° and e.g. 8°, wherein, however, primarily with axially very short mills whose utilisable axial main cutting edge length is in any case smaller than twice and in particular smaller than 1.5 times the diameter such a larger helix angle difference would appear to be reasonable, because otherwise the circumferential angular distances between adjoining main cutting edges would differ greatly, which in turn would lead to very strongly differing cutting edge loads in case of a continuous feed.

A further measure contributing to stabilisation and prevention of vibrations is, according to a preferred embodiment, a core diameter continually increasing from the frontal end towards the mounting end. The circumference or an envelope, respectively, of the core can thus, for example, substantially be in the form of a cone with a cone angle (measured with respect to the axis) of between 1° and 6° in particular between 1° and 4°.

For rough machining it is moreover convenient that the main cutting edges and the adjoining clearance surfaces of the bars of the mill have a profile varying in an axial direction. Such a varying profile can for example define a wave or tooth profile in an axial section. In particular, an asymmetric profile is preferred having alternating steeper and less steep flanks. Such profiles in the course of the cutting edges provide for better, chip breaking and may therefore reduce the forces acting upon the cutting edges. Furthermore, such asymmetric profile also yields an even smoother surface of the work piece even as a result of a roughing operation.

Moreover, at least with regard to mills having different but constant helix angles, it is preferred to limit the invention to mills whose utilisable axial cutting edge length is smaller than twice the nominal diameter of the mill. Principally, the invention may of course also be applied to axially longer milling tools; however, in this case the helix angle differences have to be reduced (e.g. to 1°-2°) or one has to accept that the circumferential angular distances vary rather strongly along the utilisable cutting edge length, which leads to partially very different cutting loads.

If, however, the difference between the helix angles is reduced too much, it is difficult to avoid larger axial regions in which the circumferential angular distances are still approximately identical.

However, the principles of the present invention may also be applied to mills having a larger axial length of their cutting portion, namely by exchanging the role of the odd and even numbered cutting edges upon reaching a particular axial position corresponding to e. g. 1.5 or 2 times the diameter of the mill when starting out from the front end thereof. This means that behind the said axial position the even numbered cutting edges comprise the relatively smaller helix angles and and odd numbered cutting edges comprise the relatively larger helix angles which in turn yields a reversal of the changes in the angular distances between the cutting edges along the further axial course thereof. Such a change may be continuously repeated as desired. In particular, such a change may even be desired for shorter length mills, namely once the difference in helix angles is fairly large such as 6° to 10°, resulting in a rapid change of the angular distances between the cutting edges with a change of the axial position, wherein an exchange between the odd and even numbered cutting edges having the smaller and larger axial helix angles may be suitable at even shorter axial distances from the front edge corresponding e. g. to only the diameter or half of the diameter of the mill.

According to one embodiment, there is associated a front end minor cutting to each of said main cutting edges which are joined via a cutting corner which may be chamfered or rounded. These minor cutting edges extend on the front face substantially along the radial direction i. e. from the periphery towards the axis of the mill, wherein at least one of said minor cutting edges may extend up to the axis.

An embodiment of the invention is particularly preferred in which the mill comprises exactly four cutting edges, wherein "$a_n$" (n=1, . . . 4) designates the angle formed between the cutting edge n and the successive cutting edge n+1 mod 4, wherein the following relation applies: $a_1<a_3<a_4<a_2$. If the helix angles of the odd-numbered cutting edges and the helix angles of the even-numbered cutting edges are identical each but different respectively between even-numbered and odd-numbered cutting edges and differ by e.g. 3°, it is achieved that approximately in the region of an axial central position (in relation to the utilisable axial cutting edge length) the circumferential angular distances $a_n$ of a mill with four cutting edges fulfil the conditions of $88°<a_1=a_4<89.5°$ and $90.5°<a_2=a_3<92°$.

Of course, these conditions may also be fulfilled without the helix angles of the odd-numbered and the even-numbered cutting edges each being identical in pairs and differing by a certain angle value.

At the axially rear end, i.e. the end of the utilisable cutting edge length facing adjacent the mounting end of the mill, the circumferential angular distances according to this embodiment should fulfil the condition of $a_4<a_2<a_1<a_3$.

In particular, this can be achieved for example by setting, in an axial central position, the circumferential angular distances $a_1$ and $a_4$ to 89° each and the circumferential angular distances $a_2$ and $a_3$ to 91° each. Furthermore, in accordance with a preferred embodiment, the helix angle $\alpha$ of the odd-numbered cutting edges could be selected to be 37° and the helix angle $\beta$ of the even-numbered cutting edges could be selected to be 40°. This means that in an axial distance D, where D is the diameter of the tool, from this central position in the direction towards the frontal end the circumferential angular distances $a_1$, $a_2$, $a_3$ and $a_4$, in this order, take the values of 79.2°; 100.8°; 81.2° and 98.8°, respectively while in the direction towards the mounting end at a distance D they would, in the same order, take the values of 98.8°; 81.2°; 100.8° and 79.2°. Moreover, at a smaller axial distance from the central position corresponding to about ⅕ of the diameter, in the direction towards the frontal end the circumferential angular distances $a_3$ and $a_4$ would take the same value (90°), while $a_1$ and $a_2$ would be different here, and moreover $a_1$ would not be identical to $a_2$, whereas at the same distance from the central position in the direction of the shaft end the circumferential angular distances $a_1$ and $a_2$ become identical (90° each), while the circumferential angular distances $a_3$ and $a_4$ are not equal to 90° and also differ from each other.

In any other axial position all four circumferential angular distances $a_1$, $a_2$, $a_3$ and $a_4$ are different from each other.

A further measure reducing the forces acting on the cutting edges typically as intermittent impacts upon a milling operation, provides in one embodiment of the invention a profile of the main cutting edges and the adjacent relief surfaces of webs which varies along the axial direction and which may, for instance, have the shape of a waved or toothed profile when seen in an axial section. Such a profile results in a separation of the chips generated along the cutting edge, which chips become narrower thereby and further may have a varying thickness along their width if providing a corresponding profile of adjacent cutting edges, which also leads to an improved breaking of the chips. In particular, the wave peaks of the profile of one web or cutting edge may be axially shifted by half of the axial distance between adjacent wave peaks. As an alternative, such an offset (always measured along the same direction) may be one third or a quarter of the above defined wavelength. Due to such a measure there may be avoided that the milled surface of the work piece comprises the same waved or toothed shape as the cutting edges since any bumps or elevations which may have been left by one of said cutting edges will be cut by the next following or any of the further cutting edges. Accordingly, in spite of such a wave shape of the individual cutting edges, it is possible to achieve extraordinary smooth surfaces of the work piece even upon roughing with large feed values (or thick chips, respectively), which in spite of an improved chipping power and improved lifetime of the tool may even have a better quality than work pieces prepared by means of prior art and mills. This is mainly due to the various features of the present invention which strongly reduce any tendency for vibrations and provide a varying distribution of forces acting on the cutting edges of the end mill which are better averaged in time.

Further advantages, features and possible implementations of the present invention become apparent from the following description of a preferred embodiment and the corresponding figures, in which.

Figure 1:
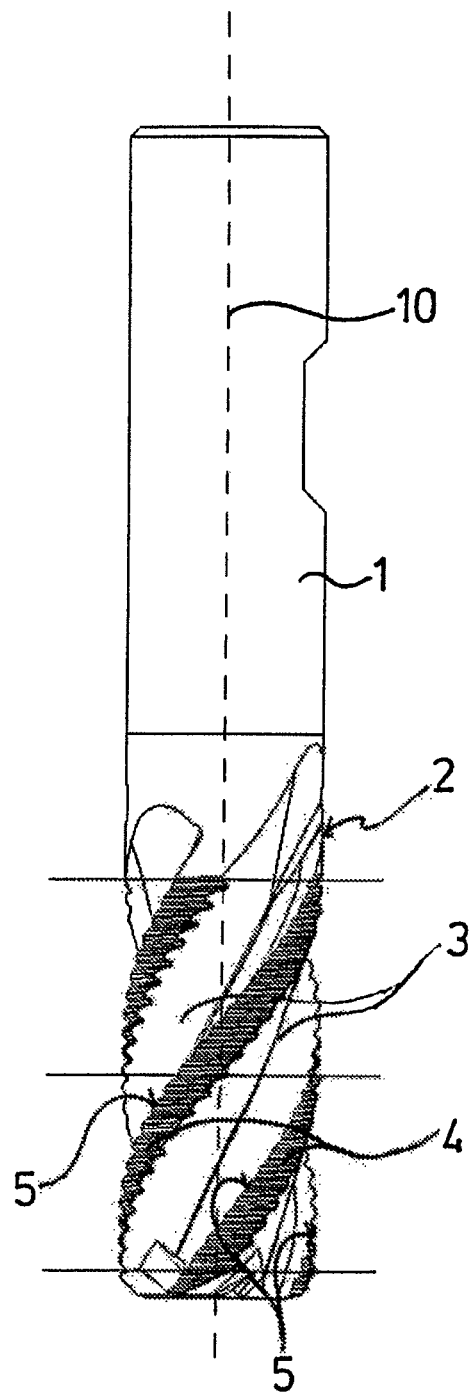
FIG. 1 shows a lateral view.
Figure 2:
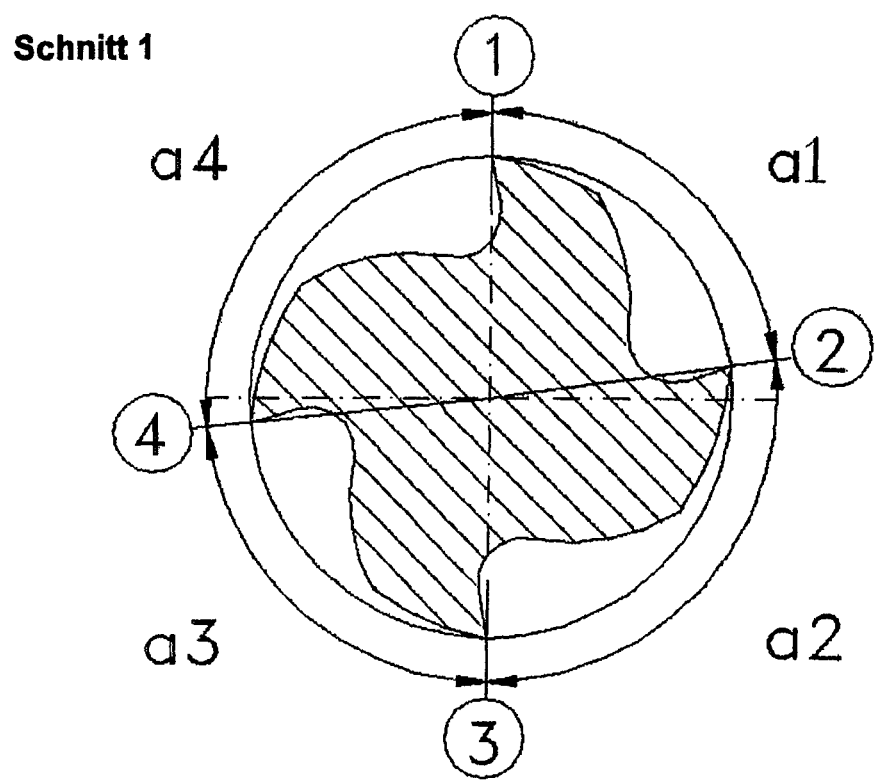
FIGS. 2 to 4 show three different cross sections.

With reference to FIG. 1, there is shown an end mill in a plan view, comprising a mounting end 1 and a cutting portion 2. The cutting portion 2 comprises chip grooves 3 and intermediate cutting maps 4, each defining a helically round cutting edge 5. These cutting edges running around the axis 10 of the mill along helical lines show different sloping angles α and β, respectively, with respect to the axis 10. In FIGS. 2 to 5, which all refer to the same embodiment, there are shown different sections through the cutting portion 2 and perpendicular with respect to the axis 10 while in FIG. 5 the outer surface of the mill or more precisely just the cutting edges 5 thereof are shown unrolled into a plane. The position of the section shown in FIG. 2 corresponds to the section line II-II in FIG. 1, while the section shown in FIG. 3 corresponds to section line in FIG. 1 and the section shown in FIG. 4 corresponds to the section line IV-IV in FIG. 1.

The terms "front", "back (or its synonym "rearward"), and "central" as used herein refer to the axial positions along the cutting portion 2 of the mill, wherein the free lower end of the cutting portion visible in FIG. 1 corresponds to the "front" position.

Figure 5:
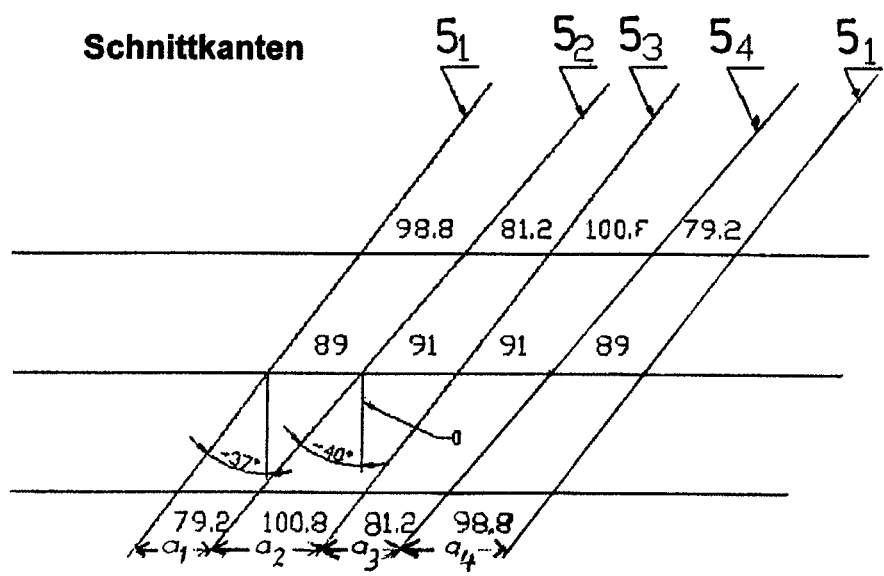
FIG. 5 shows the periphery of the mill unrolled into a plane.

In FIG. 5, the cutting edges 5 are shown as unrolled into a plane. To better distinguish the respective cutting edges of the mill according to FIG. 1, each of these cutting edges is provided with an index and denoted as $5_1$, $5_2$, $5_3$ and $5_4$, respectively, wherein the enrolment shows on the left hand side a cutting edge $5_1$, which, upon unrolling the periphery by 360°, is again repeated at the righter most end of FIG. 5. As will be appreciated, cutting edges $5_1$ to $5_4$ clearly show different slopes, wherein only two different slopes are provided for the four cutting edges $5_1$ to $5_4$, wherein the cutting edges having odd indices, namely $5_1$ and $5_3$ include an angle of about 37° with respect to the axis 10, while the cutting edges having even indices, namely cutting edges $5_2$ and $5_4$ include an angle of about 40° with respect to the axis 10. As is clearly visible in FIG. 5, this necessarily results in the fact that the peripheral distances between adjacent cutting edges 5, corresponding to the horizontal distances between the individual lines or cutting edges $5_1$ to $5_4$ in FIG. 5, vary along the axial direction of the cutting portion 2 (which means dependent on the vertical position in FIG. 5).

The position of section lines II-II, and IV-IV from FIG. 1 is again shown in FIG. 5. Cutting edges $5_1$ to $5_4$ are distributed about the periphery of the mill such that, irrespective of the position of any particular sectional plane, the angular distances $a_1$ to $a_4$ between adjacent cutting edges 5 will always have at least two and in general even four different values. The differences between said angular distances as varying along the axial position are the smallest in a sectional plane about in the axial center of the cutting portion 2, wherein the angular distances between cutting edges $5_1$ and $5_2$ and between cutting edges $5_4$ and $5_1$ are both having the same value, and also the angular distance between cutting edges $5_2$ and $5_3$ is equal to the angular distance between cutting edges $5_3$ and $5_4$, and further the different angular distances $a_1$ and $a_2$ as well as $a_3$ and $a_4$ are differing by 2°, only. However, towards both, the direction to the front end, that is towards the sectional plane II-II, and the direction to the rearward end, that is the direction towards sectional plane IV-IV, the said differences between the angular distances are increasing, while in addition all four angular distances between adjacent cutting edges $5_1$ to $5_4$ are different from each other at most of the axial positions.

This can easily be derived from FIG. 5 where the angular distances are designated by $a_1$ to $a_4$. As will be appreciated, the angular distance $a_1$, when starting out from the tip or front end and going back towards the rearward end, that is from the position of the front end sectional plane II-II to the rearward sectional plane IV-IV, increases from 79.2° to 98.8° and in a similar way also the angular distance $a_3$ increases from 81.2° to 100.8°, which means that the aforementioned two angular distances $a_1$ and $a_3$ are always different by about 2°. In contrast, the angular distance $a_2$, when starting from the sectional plane II and going towards the sectional plane IV, continuously decreases from 100.8 to 81.2°, while the angular distance $a_4$ decreases from 98.8 to 79.2°, which means that also the angular distances $a_2$ and $a_4$ are always different by about 2°, while the differences with respect to angular distances $a_1$ and $a_3$ are varying. Between the sectional plane II and III and closer towards the sectional plane III, there is only one axial position where two of the said angular distances, namely $a_3$ and $a_4$ may take the same value of 90°, while in the same axial position the angular distances $a_1$ and $a_2$ are different from each other and also different from the distances $a_3$ and $a_4$ and may, for instance, take the values of 88° and 92°, respectively.

Axially behind the sectional plane III and towards sectional plane IV, however closer to sectional plane III, there is again a single axial position where two of the angular distances, namely $a_1$ and $a_2$, take the same value of 90°, while the same axial position of the remaining angular distances $a_3$ and $a_4$ are different therefrom and are also different from each other and may, for instance, take the values of 92° and 88°, respectively.

Figure 3:
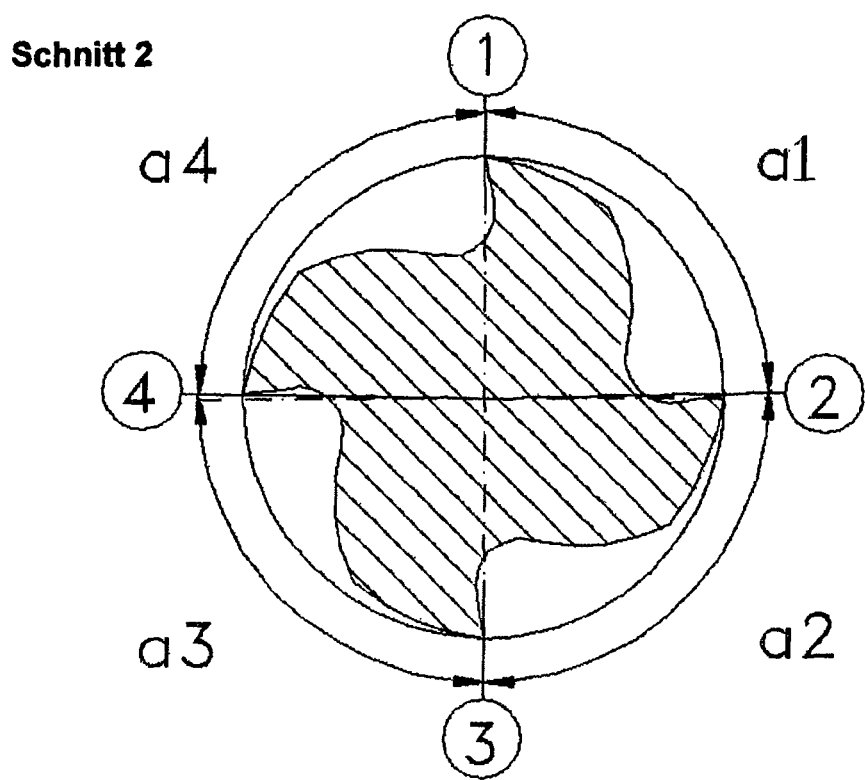
Figure 4:
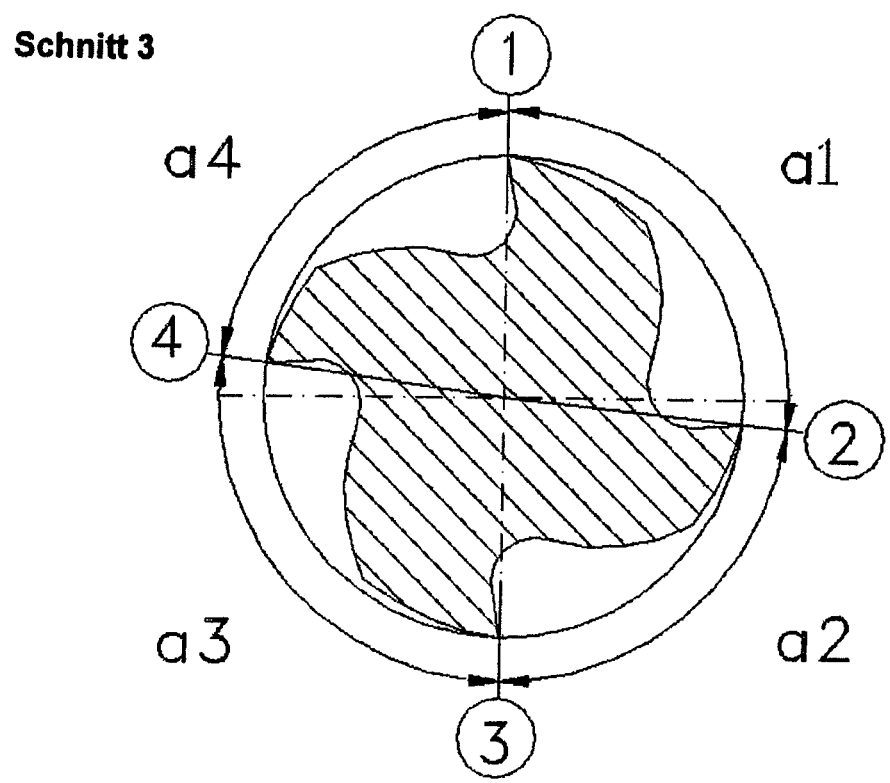

Thus, there can be seen that at each and every axial position there are at least two different angular distances between the cutting edges and there are only two particular axial positions in which two of the said angular distances are the same, while in the central axial position there are two pairs of distances which are the same. This may also be recognized from the sectional views according to FIGS. 2 to 4, wherein, as already discussed with respect to FIG. 5, the four angular distances $a_1$ to $a_4$ are closest to each other in the (central) sectional plane as shown in FIG. 3. At the front portion, namely in sectional plane II, said angular distances $a_1$ and $a_3$ are both smaller than angular distances $a_2$ and $a_4$ but are also different from each other, which also holds for the larger angular distances $a_2$ and $a_4$ in a corresponding manner. In the cross-sectional plane IV as shown in FIG. 4, respective relationships are reversed and in this case the angular distances $a_1$ and $a_3$ are each larger than angular distances $a_2$ and $a_4$, however, are still different from each other, as well.

The end mill according to the present invention has a main direction of feed perpendicular to the axis 10, wherein cutting edges $5_1$ to $5_4$ are engaging the work piece in an intermittent manner. However, due to the different angular distances $a_1$ to $a_4$, the respective periods in time between the engagement of adjacent cutting edges following one after another are each different, too, wherein further the respective points of engagement at the cutting edge will as well vary since, due to the helical course of the cutting edges $5_1$ to $5_4$, the portion leading in the direction of rotation, namely the portion near the front end of the mill engages the work piece first and thereafter the portion axially and circumferentially following there behind are engaging the work piece. As a result, any resonances and vibrations which in other cases may easily occur due to the intermittent engagement of the cutting edges of the mill are avoided since on the one hand two succeeding cutting edges will have a different angular or peripheral distance with respect to each other than the preceding or following cutting edges and moreover this angular distance is even varying along the length of adjacent cutting edges.

In addition, as can be seen in particular on basis of FIG. 1, the cutting edges are waved or have a toothed profile resulting in an effective chip breaking such that the chips generated are relatively small and do not exert any substantial action on the mill. In this context, it is particularly suitable if the respective projections and indentations on adjacent webs 4 do not occur at the same (axial) height but instead are offset such that either the immediately adjacent cutting webs 4 or diametrically opposed cutting webs 4 are displaying structures which are offset with respect to each other such that the wave peaks of one of said webs occur at the same axial position as the chuffs of the other (adjacent or diametrically opposed) web 4. Accordingly, in spite of such a wave shaped structure of webs 4 and the cutting edges 5 as shown in FIG. 1, still smooth surfaces can be obtained on a work piece.

Due to the strongly reduced tendency for vibrations of the mill according to the present invention, the latter achieves very good chipping performance, which means a high volume of chips within short time while simultaneously providing a good quality of the milled surfaces and an improved lifetime of the cutting edges, which is further supported and improved due to the wave shaped structure of the webs and cutting edges.

The invention claimed is:

1. End mill comprising an even number of main cutting edges helically extending along the circumference of the mill, said main cutting edges alternately having a relatively smaller and a relatively larger helix angle relative to an axis of the mill, the odd-numbered main cutting edges being defined by forming said smaller helix angle with the axis, wherein immediately at a frontal end circumferential angular distances of the main cutting edges following one after another in a rotational direction between the odd-numbered main cutting edges and the successive even-numbered main cutting edges are smaller than the circumferential angular distances between said even-numbered main cutting edges and said successive odd-numbered main cutting edges, wherein all circumferential angular distances at the frontal end of the mill differ from one another, and wherein the circumferential angular distances between the main cutting edges at the front end of the mill and the different helix angles are selected such that along the further axial course of the main cutting edges the circumferential angular distances between the main cutting edges in each axial position take at least two different values and that in at most a total of three different axial positions at least two circumferential angular distances are identical, while in all other positions all circumferential angular distances differ from one another.

2. End mill according to claim 1, wherein front end minor cutting edges are associated with each of said main cutting edges.

3. End mill according to claim 1, wherein in an axial position two circumferential angular distances have a first value which is identical among them, and two further circumferential angular distances have a second value which is also identical among them.

4. End mill according to claim 3, wherein the identical circumferential angular distances are respective adjoining circumferential angular distances.

5. End mill according to claim 1, wherein the helix angle of the odd-numbered main cutting edges is in the range between 35° and 39° and that the helix angle of the even-numbered main cutting edges is in the range between 38° and 42°.

6. End mill according to claim 1, wherein the core diameter of the mill continually increases from the frontal end towards the mounting end.

7. End mill according to claim 1, comprising a cutting portion defined by chip grooves and intermediate maps separating said chip grooves, and main cutting edges defined by the intersection of the chip grooves with clearance surfaces formed by the radial outer surfaces of the maps, wherein the main cutting edges and the adjoining clearance surfaces of the maps have a profile varying in an axial direction.

8. End mill according to claim 7, wherein in an axial section the profile is a wave or tooth profile.

9. End mill according to claim 7, wherein the profile is an asymmetric profile with alternating steeper and less steep flanks.

10. End mill according to claim 1, wherein the utilisable axial cutting edge length is smaller than twice the nominal diameter of the mill.

11. End mill according to claim 1, wherein the helix angles are changing by exchanging the relatively smaller and larger helix angles between the odd end even numbered cutting edges after reaching a predetermined axial position when starting out from the front end.

12. End mill according to claim 1, comprising exactly four cutting edges, wherein $a_n$ (n=1, ... 4) forms the angle between the cutting edge n and the next following cutting edge n+1 mod 4, wherein the following condition applies at the front end of the mill:

$a_1 < a_3 < a_4 < a_2$.

13. End mill according to claim 12, wherein approximately in the area of an axial central position the circumferential angular distances of a mill with four cutting edges fulfill the conditions of $88° < a_1 = a_4 < 89.5°$ and $90.5° < a_2 = a_3 < 92°$.

14. End mill according to claim 1, wherein at the axially rear end of the utilisable main cutting edge length the circumferential angular distances fulfill the condition of $a_4 < a_2 < a_1 < a_3$.

15. End mill according to claim 2, wherein the front end minor cutting edges associated with each of said main cutting edges are joined via a cutting corner which is rounded or chamfered.

16. End mill according to claim 3, wherein the axial position approximately corresponds to an axial central position between the frontal end and the rear end of the main cutting edges.

* * * * *